(12) United States Patent
Bush et al.

(10) Patent No.: US 8,977,771 B2
(45) Date of Patent: Mar. 10, 2015

(54) MANAGING A PLURALITY OF MEDIA FILES FOR DISTRIBUTION USING AN ARCHIVE

(75) Inventors: Christopher Leon Bush, Austin, TX (US); Joshua Frank Nedelka, Meriden, CT (US); Didier Garcia La Rosa, Miami, FL (US); Mark Rutenburg, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1831 days.

(21) Appl. No.: 11/866,056

(22) Filed: Oct. 2, 2007

(65) Prior Publication Data

US 2009/0089411 A1 Apr. 2, 2009

(51) Int. Cl.
 *G06F 15/16* (2006.01)
 *G06F 17/30* (2006.01)

(52) U.S. Cl.
 CPC ............ *G06F 17/30053* (2013.01)
 USPC ............ 709/232; 709/233; 709/234; 709/235

(58) Field of Classification Search
 CPC ............................................. H04L 29/06
 USPC .................. 709/232, 233, 234, 235
 See application file for complete search history.

(56) References Cited

U.S. PATENT DOCUMENTS

| | | | |
|---|---|---|---|
| 6,192,340 B1 | 2/2001 | Abecassis | |
| 7,089,309 B2 * | 8/2006 | Ramaley et al. | 709/226 |
| 7,096,234 B2 | 8/2006 | Plastina et al. | |
| 2007/0079352 A1 | 4/2007 | Klein, Jr. | |
| 2007/0083471 A1 * | 4/2007 | Robbin et al. | 705/51 |
| 2007/0260604 A1 * | 11/2007 | Haeuser et al. | 707/9 |
| 2007/0266028 A1 * | 11/2007 | Muller et al. | 707/8 |
| 2008/0072264 A1 * | 3/2008 | Crayford | 725/86 |

FOREIGN PATENT DOCUMENTS

| | | |
|---|---|---|
| WO | 2004071094 A1 | 8/2004 |
| WO | 2006018783 A1 | 2/2006 |

* cited by examiner

*Primary Examiner* — Derrick Ferris
*Assistant Examiner* — Abdelnabi Musa
(74) *Attorney, Agent, or Firm* — Yee & Associates, P.C.; Parashos T. Kalaitzis (57) ABSTRACT

A computer implemented method, apparatus, and computer usable program code for distributing media content. A plurality of media files are identified for distribution. A determination is made whether any of the plurality of media files is unavailable remotely. In response to a determination that a portion of the plurality of media files is unavailable remotely, a portion of the plurality of media files is placed in an archive. A playlist identifying the plurality of media files is placed in the archive. A set of links to each of the plurality of media files that are available remotely are placed in the archive, wherein the archive is used to distribute the media content.

15 Claims, 4 Drawing Sheets

MANAGING A PLURALITY OF MEDIA FILES FOR DISTRIBUTION USING AN ARCHIVE

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for distributing media files and playlists.

2. Description of the Related Art

The Internet is a global network of computers and networks joined together by means of gateways that handle data transfers and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as, text files, graphic images, animation files, audio files, and video files.

In transferring data over the Internet, playlists and media files are examples of types of media content that may be distributed across the Internet. In distributing this type of content, it is desirable to send minimal amounts of data to a recipient that allows the recipient to access the playlist and the media. Some current software applications that provide playlist packaging solutions allow a user to package playlists with media files. An example is Windows Media® Player, which is available from Microsoft Corporation. Windows Media is a registered trademark of Microsoft Corporation. This type of package is also referred to as an archive. An archive is a type of file that is used to collect multiple data files together in a single file for easier portability. Other software applications only send playlists and do not include the files themselves in the packages or archives. As a result, these media files have to be obtained through other mediums or mechanisms.

Current packaging or archive systems that allow for playlists and the media files to be included make it easy for a recipient to immediately listen to or view media files once they are received. The drawback to this type of system, however, is that the amount of data that may be sent may be large and require more time to download.

SUMMARY OF THE INVENTION

The illustrative embodiments provide a computer implemented method, apparatus, and computer usable program code for distributing media content. A plurality of media files are identified for distribution. A determination is made whether any of the plurality of media files is unavailable remotely. In response to a determination that a portion of the plurality of media files is unavailable remotely, a portion of the plurality of media files is placed in an archive. A playlist identifying the plurality of media files is placed in the archive. A set of links to each of the plurality of media files that are available remotely are placed in the archive, wherein the archive is used to distribute the media content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
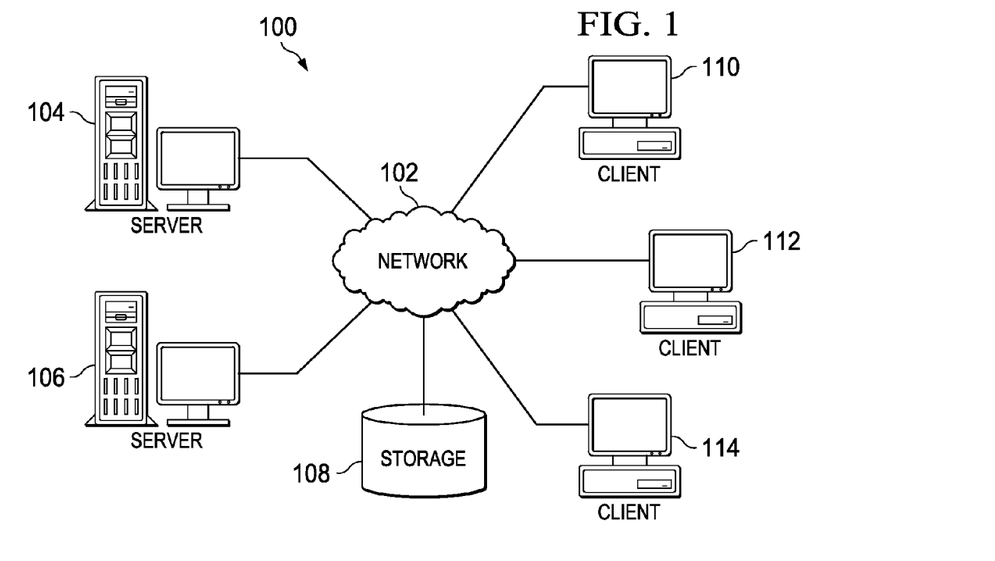
FIG. 1 is a pictorial representation of a network of data processing systems in which illustrative embodiments may be implemented.
Figure 2:
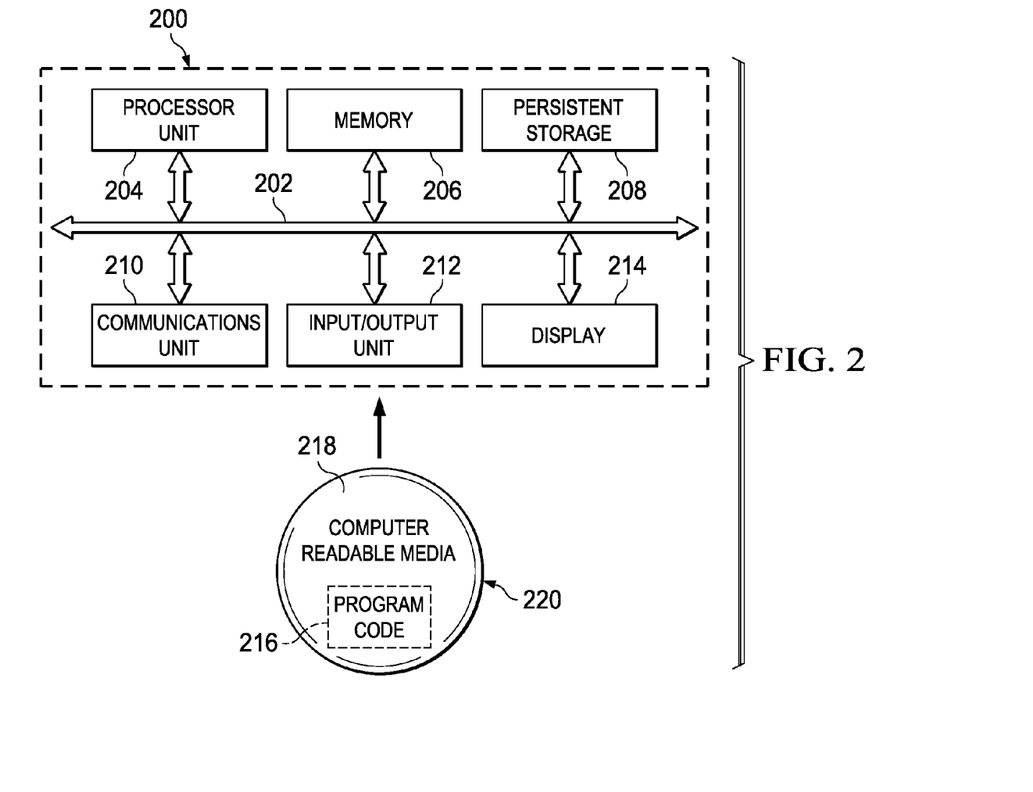
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In these examples, packages or archives containing playlists and media files may be distributed between different clients and servers within network data processing system 100. The different illustrative embodiments provide a computer implemented method, apparatus, and computer usable program code for distributing this type of media content within network data processing system 100. The different advantageous embodiments may be implemented in different data processing systems within network data processing system 100 to reduce the amount of data transferred when distributing media content. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With these different illustrative embodiments, a user at a client or server may operate or use software to create archives to distribute media content. In these examples, the archives may include playlists and media files. The different illustrative embodiments provide a computer implemented method, apparatus, and computer usable program code for distributing media content. Media files are identified for distribution. A determination is made as to whether any of the media files that are identified are unavailable remotely. If a determination is made that a portion of the media files are unavailable remotely, the portion of the media file is placed in the archive.

This portion is one or more media files. A playlist identifying the media files for distribution also are placed in the archive. A set of links is placed in the archive for each of the media files available remotely. This archive may be used to distribute the media content.

In these examples, the media files may be audio files, video files, pictures, or some other media file types. A media file is considered to be non-remotely available or unavailable remotely if this content is not accessible by the recipient of the media files. For example, media files created locally on a computer in which the software is operating may be considered unavailable remotely if the computer does not have a service or application that provides access to those files. The links for remotely available media files are provided such that a recipient of the archive may select which files they wish to hear and download those files. In this manner, only including content that is not available remotely to recipients, the size of an archive may be reduced because only those media files that are not available remotely are included in the archive.

Figure 3:
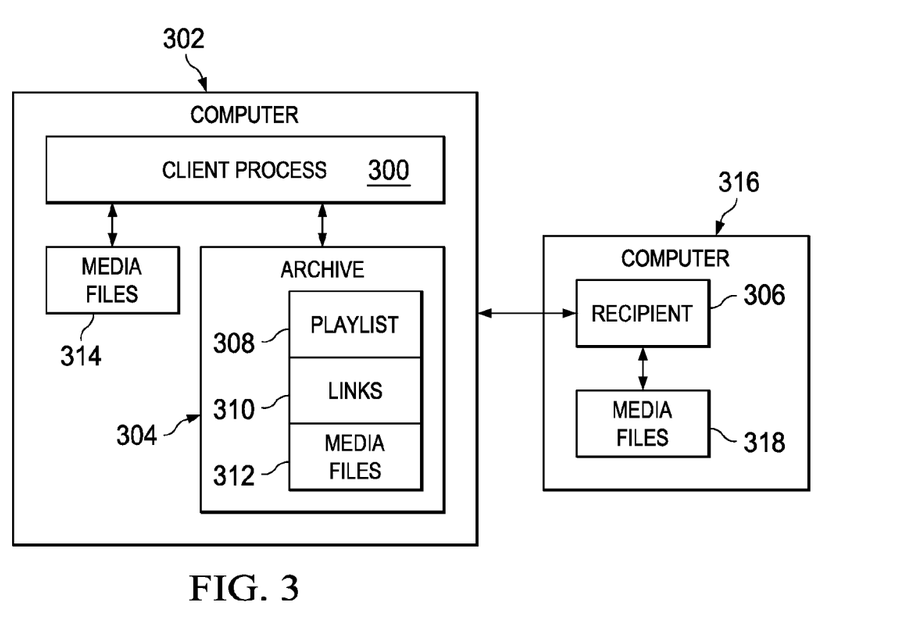
FIG. 3 is a diagram illustrating components used to distribute media content in accordance with an illustrative embodiment.

Turning now to FIG. 3, a diagram illustrating components used to distribute media content is depicted in accordance with an illustrative embodiment. Client process 300 executes on computer 302, which may be implemented using a data processing system, such as data processing system 200 in FIG. 2.

In this example, client process 300 may be an application or software that is specifically designed to create archives. In other examples, client process 300 may take the form of a media player modified to include the processes and features of the different illustrative embodiments.

As depicted, client process 300 is used to create archive 304 for distribution to a client application or recipient, such as recipient 306. In this example, recipient 306 is a process or application executing computer 316, which may be implemented using a data processing system, such as data processing system 200 in FIG. 2. Recipient 306 may be, for example, a media player program or application that plays media files on computer 316.

Archive 304 includes playlist 308, links 310, and media files 312. Playlist 308 includes a list of the media files for a media player. Links 310 contains a pointer or universal resource locator to media files or other content that is not available remotely to recipient 306.

Client process 300 determines whether any of the media files in playlist 308 are available only locally by examining media files 312. Media files 312 are different media files that are present on the same computer system as client process 300. In these examples, links 310 may be part of the metadata within playlist 308. As a result, archive 304 has a size that is smaller than an archive that contains all of the media files in media files 312 identified in playlist 308.

Further, client process 300 may check recipient 306 to determine whether any of the media files in playlist 308 are present only locally in medial files 314 on recipient 306. This type of check may be made by adding a checksum to playlist 308 for each media file listed within playlist 308. With this type of feature, playlist 308, with the checksums, is sent to recipient 306 without any media files.

In response to receiving playlist 308, recipient 306 generates checksums for the media files located at recipient 306 and compares those checksums to the checksums in the playlist. Matches indicate that recipient 306 already has the media files within media files 318. In this embodiment, recipient 306 returns a response to client process 300 indicating or identifying whether any files in playlist 308 are present in media files 318. In this instance, only media files not remotely available and not already located in media files 318 are sent by client process 300 to recipient 306.

With this type of embodiment, the amount of data transferred in distributing media content is further reduced by identifying media files already located at a recipient and only packaging and sending media files to recipient 306 that do not duplicate content already present in media files 318.

In this example, the final distribution may include archive 304, as described above. In other embodiments, only media files 312 may be sent along with links 310 for remotely available content. Further, archive 304 may include a notification that indicates content may be requested that is not included within archive 304. At that time, a user at recipient 306 may request the content from those sources at that time.

Figure 4:
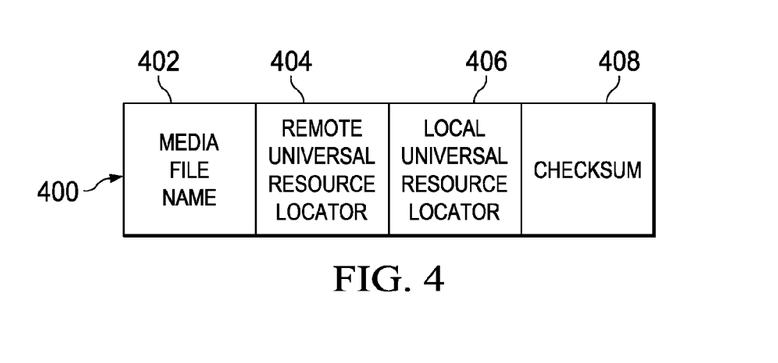
FIG. 4 is a diagram illustrating an example entry in a playlist in accordance with an illustrative embodiment.

Turning now to FIG. 4, a diagram illustrating an example entry in a playlist is depicted in accordance with an illustrative embodiment. In this example, entry 400 is an example of an entry for a playlist containing metadata about each media file in the playlist. In this example, entry 400 contains media file name 402, remote universal resource locator (URL) 404, local universal resource locator (URL) 406, and checksum 408. Media file name 402 identifies the media file and may be the name of the particular song or video. In other implementations, the media file name may be some arbitrary file name, depending on the particular implementation. Remote universal resource locator 404 is null or does not have a value if the remote universal resource locator is no longer valid or the content is not available remotely. Local universal resource locator 406 will have a null value if the content has not been downloaded.

When a value is present for either of these universal resource locators, the universal resource locator provides the location of the content. In the different illustrative examples, only media files that do not have a valid remote universal resource locator are included.

A universal resource locator, in these examples, is considered to be invalid if the universal resource locator is null or if a response is not received when an attempt is made to reach or "ping" the universal resource locator. The response to a ping happens immediately before the playlist packaging occurs.

If the media is no longer available, the user may then specify a new remote universal resource locator for the file or choose to have it included as local content. Additionally, a user may be able to choose to send content that has not been downloaded to their system and has a remote universal resource locator entry in the playlist.

In entry 400, checksum 408 is a field that contains the checksum for the media file identified for entry 400. This checksum may be used by a recipient to determine whether the media file is already present at the recipient data processing system. A checksum is a form of redundancy check that may be used to verify whether the file at the sender's location is the same file as the recipient's file.

Figure 5:
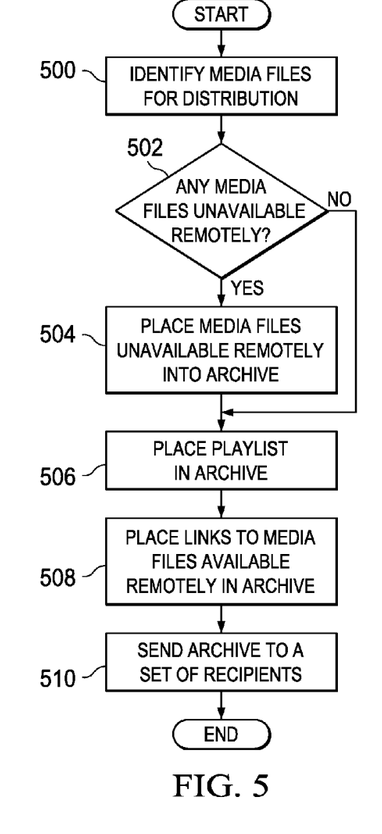
FIG. 5 is a high level flowchart of a process for distributing media content in accordance with an illustrative embodiment.

With reference now to FIG. 5, a high level flowchart of a process for distributing media content is depicted in accordance with an illustrative embodiment. The process illustrated in FIG. 5 may be implemented in a software component, such as client process 300 in FIG. 3.

The process begins by identifying media files for distribution (step 500). Thereafter, a determination is made as to whether any of the media files identified for distribution are unavailable remotely (step 502). If any of the media files are unavailable remotely, those media files are placed into the archives (step 504). Next, a playlist is placed into an archive (step 506). Links to the media files that are available remotely also are placed into the archive (step 508). Step 508 may be implemented by including these media links as a part of the entries in the playlist. Thereafter, the archive is sent to a set of recipients (step 510), with the process terminating thereafter.

With reference again to step 502, if none of the media files are unavailable remotely, then step 504 is skipped and the process proceeds to step 506 directly. In this case, all of the media files in the playlist may be obtained from remote sources.

As a result, the process does not include any of the media files in the package or archive. In this manner, the different illustrative embodiments reduce the amount of data needed to distribute media content to recipients. These different illustrative embodiments only send content that is not remotely available to the recipients. In these examples, the identification is made by checking to see whether the content is only available locally.

Further, the different illustrative embodiments also may perform a process to determine whether locally available content may already be present on the recipient's data processing system through sending a playlist with checksums for comparison by the recipient's data processing system with media files already present on the recipients data processing system. In this manner, the recipient may have already obtained copies of media files that are not remotely available.

Figure 6:
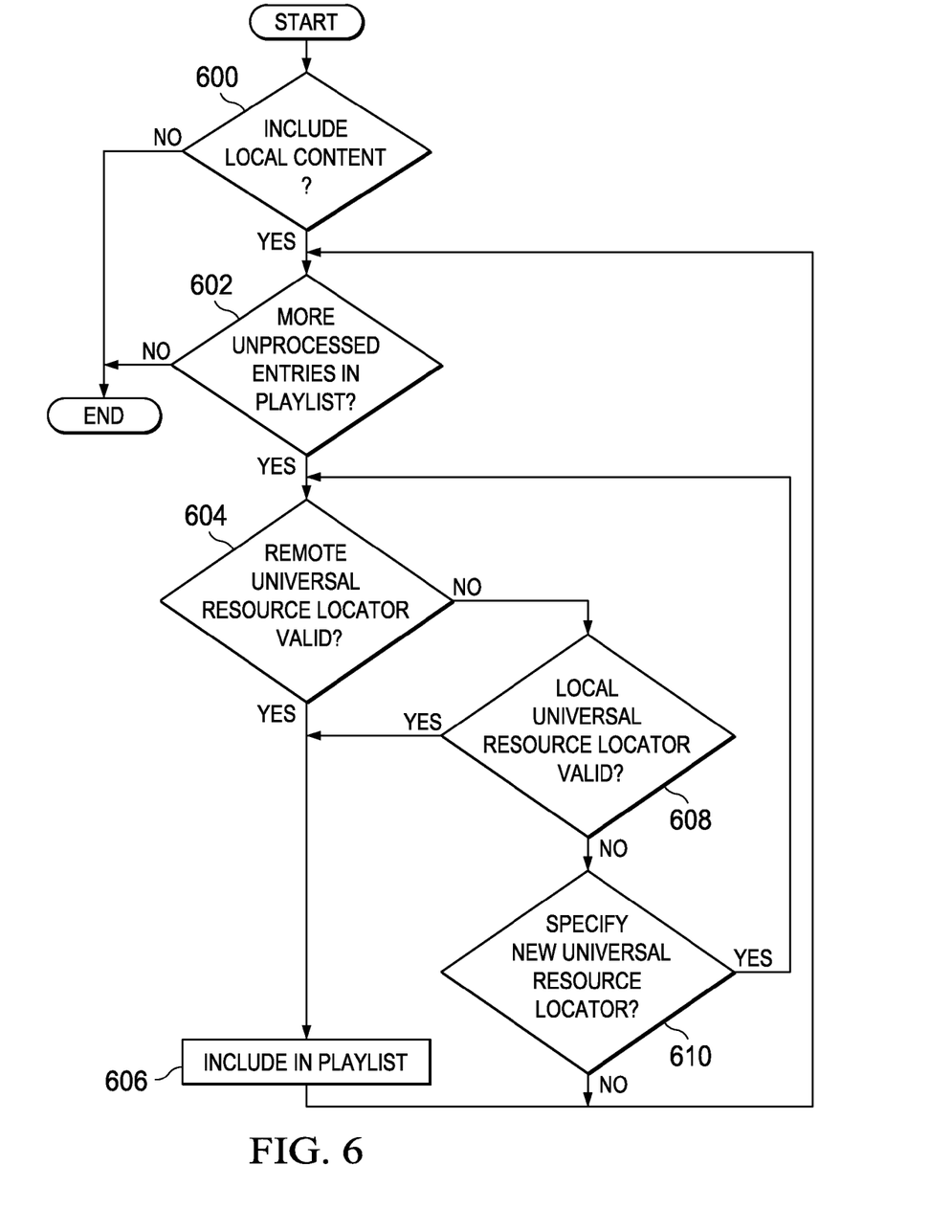
FIG. 6 is a flowchart of a process for processing a playlist in accordance with an illustrative embodiment.

Turning now to FIG. 6, a flowchart of a process for processing a playlist is depicted in accordance with an illustrative embodiment. In this example, the process may be implemented in a software component, such as client process 300 in FIG. 3.

The process begins by determining whether to include local content in an archive (step 600). If local content is to be included, the process determines whether the playlist has more unprocessed entries for processing (step 602). If additional entries are present in the playlist, a determination is made as to whether the remote universal resource locator is valid (step 604). If the remote universal resource locator is valid, the file is included in the playlist (step 606), with the process then returning to step 602 to determine whether the playlist has more unprocessed entries for processing.

With reference again to step 604, if the remote universal resource locator is not a valid universal resource locator, the process determines whether the local universal resource locator is valid (step 608). If the local universal resource locator is valid, the item is then included in the playlist in step 606. Otherwise, a determination is made as to whether a new universal resource locator is to be specified (step 610). If a new universal resource locator is to be specified, the process returns to step 604 as described above. In these examples, the determination in step 610 may involve determining whether user input has been received identifying another universal resource locator. Otherwise, the process returns to step 602 to determine whether additional items are in the playlist. If additional items are no longer in the playlist, the process then terminates.

With reference again to step 600 if local content is not to be included, the process also terminates. In this instance, only the playlist with the pointers to the remotely accessible content may be sent to the recipients. An archive with files is unnecessary, in this instance, because all of the files are available remotely.

Figure 7:
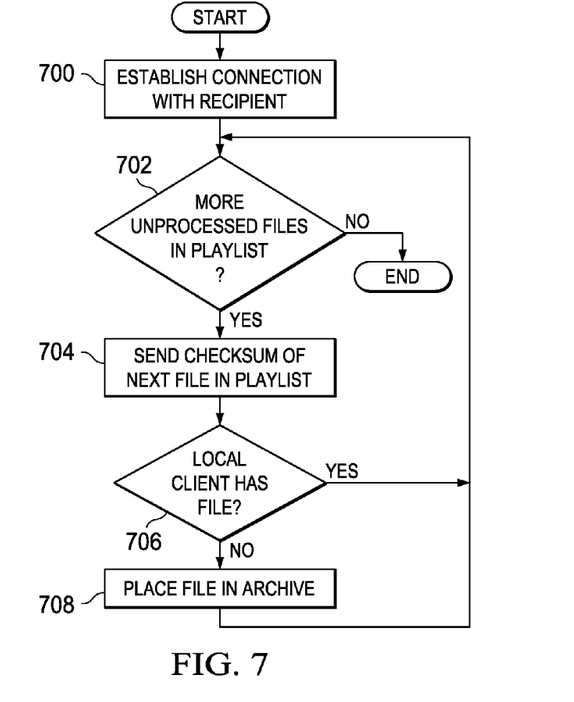
FIG. 7 is a flowchart of a process for sending a playlist in accordance with an illustrative embodiment.

Turning now to FIG. 7, a flowchart of a process for sending a playlist with checksums is depicted in accordance with an illustrative embodiment. The process in FIG. 7 may be implemented in a software component, such as client process 300 in FIG. 3. This process may be used to identify whether any files in the playlist are currently present on the recipient's data processing system.

The process begins by establishing a connection with a recipient (step 700). In these examples, the recipient may be, for example, recipient 306 in FIG. 3. This recipient may be, for example, a media player application located on a data processing system. A determination is made as to whether unprocessed files are present on the playlist (step 702). If additional unprocessed files are in the playlist, the process sends the checksum for the next file in the playlist (step 704).

A determination is made as to whether the local client has the file (step 706). In these examples, the determination in step 706 is made by comparing the checksum for the file or entry in the playlist with the checksums of media files for the client. If the local client has the file, the process then returns to step 702 as described above. Otherwise, the process places the file in the archive for the recipient (step 708), with the process then returning to step 702. In other embodiments, step 708 may be implemented to send the identified file to the recipient at that time the determination is made, instead of placing the file into an archive for later transmission. If no additional files are in the playlist in step 702, the process terminates because the client has all of the files in the playlist.

Thus, the different advantageous embodiments provide a computer implemented method, apparatus, and computer usable program code for distributing media content. Media files are identified for distribution and a determination is made as to whether any of the media files are unavailable remotely. In response to a determination that a portion of the media files are unavailable remotely, those portions of the media files are placed into an archive. A playlist identified also is placed into the archive. Links to each of the media files that are available remotely are placed into the archive and the archive is used to distribute the media content.

The different features may be used in many different applications in which media files are distributed. For example, the different embodiments may be applied to distributing media in the form of music files to recipients that may be other users or clients of the sender. The media also may be, for example, learning or teaching videos that are created and distributed to students or teachers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, although the different processes and features are shown and described with respect to a computer, these processes and features may be implemented in other types of data processing systems having processor units, such as a media player, a mobile phone, a personal digital assistant. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for distributing media content, the computer implemented method comprising:
   identifying, by a processor, a plurality of media files for distribution;
   determining, by the processor, whether any of the plurality of media files are unavailable remotely;
   responsive to a determination that a portion of the plurality of media files are unavailable remotely, placing, by the processor, the portion of the plurality of media files in an archive;
   placing, by the processor, a playlist identifying the plurality of media files in the archive; and
   placing, by the processor, a set of links to each of the plurality of media files that are available remotely in the archive, wherein the archive is used to distribute the media content.

2. The computer implemented method of claim 1 further comprising:
   sending, by the processor, the archive to a set of recipients.

3. The computer implemented method of claim 1 further comprising:
   determining, by the processor, whether any of the portion of the plurality of media files are available on a data processing system for a recipient of the archive; and
   responsive to a media file in the portion of the plurality of media files being available on the data processing system, identifying the portion as the portion without the media file and wherein the playlist excludes the media file.

4. The computer implemented method of claim 3, wherein the step of determining whether any of the portion of the plurality of media files are available on the data processing system for the recipient of the archive comprises:
   sending, by the processor, a checksum for a selected media file to the data processing system;
   comparing, by the data processing system, the checksum to checksums for media files on the data processing system to form a comparison; and
   receiving, by the processor, a response to the comparison.

5. The computer implemented method of claim 1, wherein the media content includes at least one of music files and video files.

6. A non-transitory computer-readable storage medium having a computer program product encoded thereon for distributing media content, the computer program product comprising:
   program code stored on the non-transitory computer readable medium for identifying a plurality of media files for distribution;
   program code stored on the non-transitory computer readable medium for determining whether any of the plurality of media files are unavailable remotely;
   program code stored on the non-transitory computer readable medium, responsive to a determination that a portion of the plurality of media files are unavailable remotely, for placing the portion of the plurality of media files in an archive;
   program code stored on the non-transitory computer readable medium for placing a playlist identifying the plurality of media files in the archive; and
   program code stored on the non-transitory computer readable medium for placing a set of links to each of the plurality of media files that are available remotely in the archive, wherein the archive is used to distribute the media content.

7. The non-transitory computer-readable storage medium of claim 6, the computer program product further comprising:
   program code stored on the non-transitory computer readable medium for sending the archive to a set of recipients.

8. The non-transitory computer-readable storage medium of claim 6, the computer program product further comprising:
   program code stored on the non-transitory computer readable medium for determining whether any of the portion of the plurality of media files are available on a data processing system for a recipient of the archive; and
   program code stored on the non-transitory computer readable medium, responsive to a media file in the portion of the plurality of media files being available on the data processing system, for identifying the portion as the portion without the media file and wherein the playlist excludes the media file.

9. The non-transitory computer-readable storage medium of claim 8, wherein the program code stored on the non-transitory computer readable medium for determining whether any of the portion of the plurality of media files are available on the data processing system for the recipient of the archive comprises:
   program code stored on the non-transitory computer readable medium for sending a checksum for a selected media file to the data processing system;

program code stored on the non-transitory computer readable medium for comparing the checksum to checksums for media files on the data processing system to form a comparison; and program code stored on the non-transitory computer readable medium for receiving a response to the comparison.

10. The non-transitory computer-readable storage medium of claim 6, wherein the media content includes at least one of music files and video files.

11. A data processing system comprising:
a bus;
a communications unit connected to the bus;
a storage device includes computer usable program code; and
a processor unit connected to the bus, wherein the processor unit executes the computer usable program to identify a plurality of media files for distribution; determine whether any of the plurality of media files are unavailable remotely; place a portion of the plurality of media files in an archive in response to a determination that the portion of the plurality of media files are unavailable remotely; place a playlist identifying the plurality of media files in the archive; and place a set of links to each of the plurality of media files that are available remotely in the archive, wherein the archive is used to distribute the media content.

12. The data processing system of claim 11 the processor unit further executes the computer usable program code to send the archive to a set of recipients.

13. The data processing system of claim 11, wherein the processor unit further executes the computer usable program code to determine whether any of the portion of the plurality of media files are available on a data processing system for a recipient of the archive; and identify the portion as the portion without the media file and wherein the playlist excludes a media file in response to the media file in the portion of the plurality of media files being available on the data processing system.

14. The data processing system of claim 13, wherein in executing the computer usable program code to determine whether any of the portion of the plurality of media files are available on the data processing system for the recipient of the archive, the processor executes the computer usable program code to send a checksum for a selected media file to the data processing system; compare the checksum to checksums for media files on the data processing system to form a comparison; and receive a response to the comparison.

15. The data processing system of claim 11, wherein the media content includes at least one of music files and video files.

* * * * *